US009339792B2

(12) United States Patent
Idriss et al.

(10) Patent No.: US 9,339,792 B2
(45) Date of Patent: May 17, 2016

(54) PHOTOCATALYST, METHOD FOR PREPARATION, PHOTOLYSIS SYSTEM

(71) Applicant: SAUDI BASIC INDUSTRIES CORPORATION, Riyadh (SA)

(72) Inventors: Hicham Idriss, Riyadh (SA); Ahmed Wahab Khaja, Riyadh (SA); Taiwo Odedairo, Riyadh (SA); Majed Mohammed Mussa, Riyadh (SA)

(73) Assignee: SAUDI BASIC INDUSTRIES CORPORATION, Riyadh (SA)

( * ) Notice: Subject to any disclaimer, the term of this patent is extended or adjusted under 35 U.S.C. 154(b) by 0 days.

(21) Appl. No.: 14/395,010

(22) PCT Filed: Apr. 22, 2013

(86) PCT No.: PCT/EP2013/001190
§ 371 (c)(1),
(2) Date: Oct. 16, 2014

(87) PCT Pub. No.: WO2013/159894
PCT Pub. Date: Oct. 31, 2013

(65) Prior Publication Data
US 2015/0098893 A1 Apr. 9, 2015

(30) Foreign Application Priority Data
Apr. 26, 2012 (EP) .................... 12002966

(51) Int. Cl.
*B01J 35/00* (2006.01)
*B01J 19/12* (2006.01)
(Continued)

(52) U.S. Cl.
CPC ............. *B01J 23/58* (2013.01); *B01J 21/063* (2013.01); *B01J 35/004* (2013.01); *B01J 37/031* (2013.01);
(Continued)

(58) Field of Classification Search
CPC ............ C01B 2203/1082; C01B 3/042; C01B 2203/107; C01B 2203/0277; C01B 2203/1064; C01B 3/22; C01B 2203/1041; C01B 3/26; C01B 2203/12; B01J 23/58; B01J 37/036; B01J 37/031; B01J 21/063; B01J 35/004; C02F 2305/10; C01G 23/006
See application file for complete search history.

(56) References Cited

U.S. PATENT DOCUMENTS 6,130,017 A   10/2000  Hayashi et al.
7,909,979 B2   3/2011  Yamada et al.
(Continued)

FOREIGN PATENT DOCUMENTS

EP    0070712 A2    1/1983
EP    2092981 A1    8/2009
JP    2003288955 A  10/2003

OTHER PUBLICATIONS

Yan et al. "Nitrogen-doped SrTiO3/TiO2 composite photocatalysts for hydrogen production under visible light irradiation", Journal of Alloys and Compounds 472, 2009, 429-433.*
(Continued)

*Primary Examiner* — Stanley Silverman
*Assistant Examiner* — Syed Iqbal
(74) *Attorney, Agent, or Firm* — Cantor Colburn LLP

(57) ABSTRACT

The present invention relates to a photocatalyst for the generation of diatomic hydrogen from a hydrogen containing precursor under the influence of actinic radiation comprising semiconductor support particles comprised of $SrTiO_3$ and $TiO_2$ with one or more noble and/or transition metals deposited thereon. Further disclosed is a method for preparing such catalyst and a method for generating diatomic hydrogen by photolysis.

20 Claims, 3 Drawing Sheets

Figure 1A:
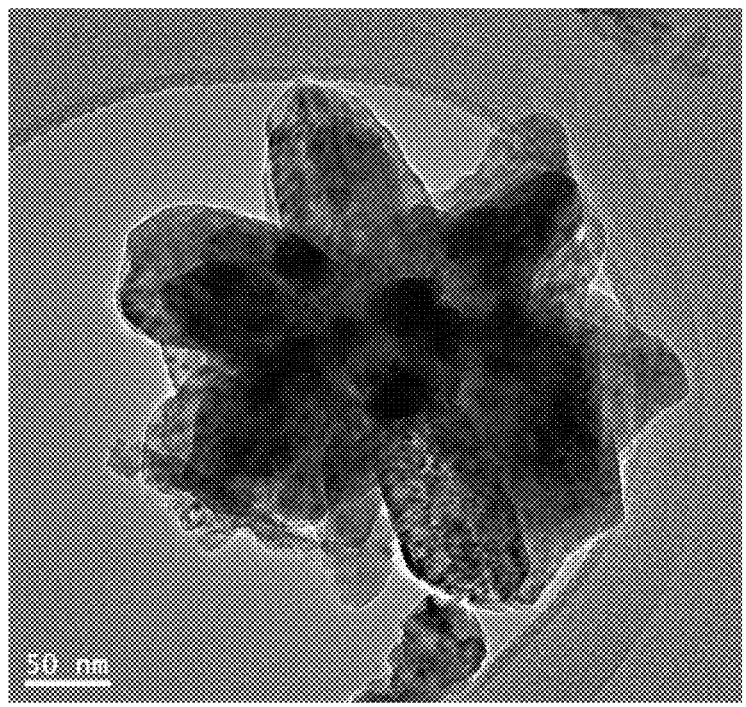
Figure 1B:
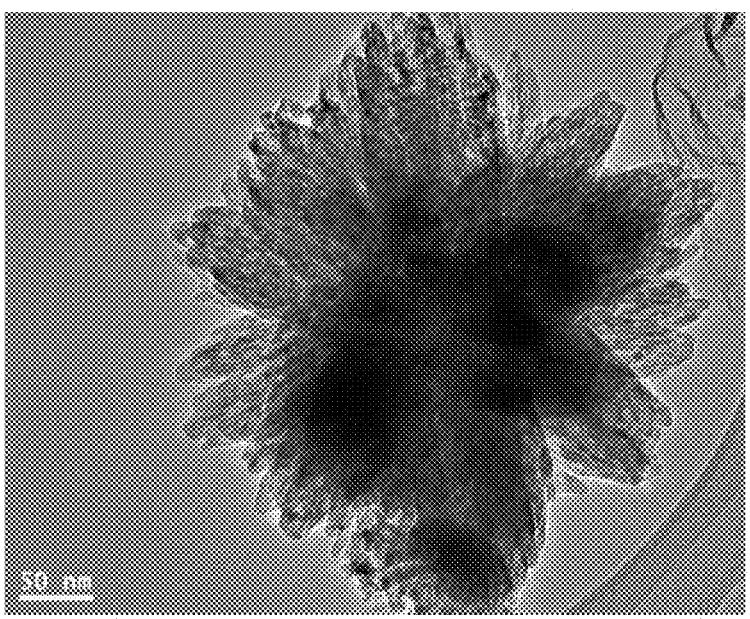
Figure 1C:
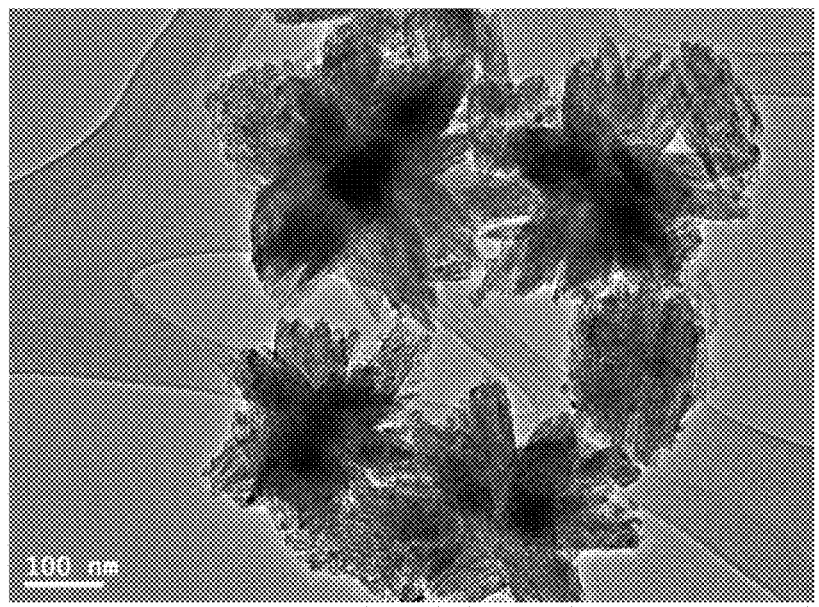
Figure 1D:
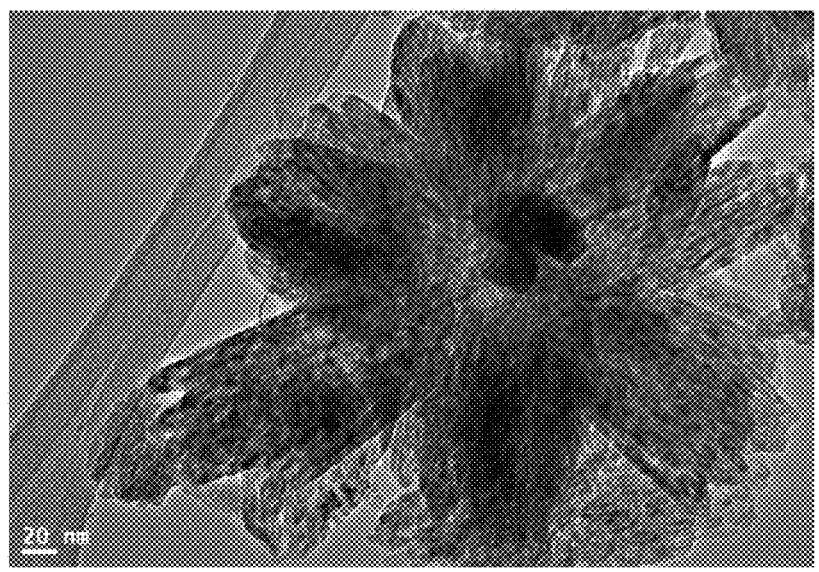

(51) Int. Cl.
| | |
|---|---|
| C02F 1/32 | (2006.01) |
| C02F 1/30 | (2006.01) |
| C01G 23/00 | (2006.01) |
| B01J 23/58 | (2006.01) |
| B01J 21/06 | (2006.01) |
| C01B 3/04 | (2006.01) |
| B01J 37/03 | (2006.01) |
| C01B 3/26 | (2006.01) |
| C01B 3/22 | (2006.01) |

(52) U.S. Cl.
CPC ............... *B01J 37/036* (2013.01); *C01B 3/042* (2013.01); *C01B 3/22* (2013.01); *C01B 3/26* (2013.01); *C01G 23/006* (2013.01); *C01B 2203/0277* (2013.01); *C01B 2203/107* (2013.01); *C01B 2203/1041* (2013.01); *C01B 2203/1064* (2013.01); *C01B 2203/1082* (2013.01); *C01B 2203/1229* (2013.01); *C02F 2305/10* (2013.01); *Y02E 60/364* (2013.01)

(56) References Cited

U.S. PATENT DOCUMENTS

| | | |
|---|---|---|
| 2003/0144140 A1 | 7/2003 | Matsuo et al. |
| 2006/0029536 A1 | 2/2006 | Kim et al. |
| 2007/0297973 A1 | 12/2007 | Chen et al. |
| 2009/0117383 A1 | 5/2009 | Isobe et al. |
| 2011/0008720 A1 | 1/2011 | Yasukawa et al. |
| 2011/0214996 A1 | 9/2011 | Yoshida et al. |

OTHER PUBLICATIONS

Potdar et al. "Low temperature synthesis of ultrafine strontium titanate (SrTiO3) powders", J. Mater. Res, vol. 7, No. 2, Feb. 1992, p. 429-434.*

"Photocatalysis" Accessed from Wikipedia; May 11, 2012; 4 Pages.
"Plasmon" Accessed from Wikipedia; May 3, 2012; 5 Pages.
Connelly et al., "The photoreaction of TiO2 and Au/TiO2 single crystal and powder surfaces with organic adsorbates. Emphasis on hydrogen production from renewables," Green Chem., 2012, vol. 14, p. 260-280.
European Search Report, Eurpopean Applicaiton No. 12002966.5; Date of Search: Sep. 20, 2012; Date of Mailing: Oct. 4, 2012; 10 Pages.
Fujishima et al., "Electrochemical Photolysis of Water at a Semiconductor Electrode," Nature, 1972, vol. 238, pp. 37-38.
International Search Report; International Application No. PCT/EP2013/001190; Filing Date: Apr. 22, 2013; Date of Mailing: Jun. 25, 2013; 5 Pages.
Jian-Hui et al., "Nitrogen-doped SrTiO3/TiO2 Composite Photocatalysts for Hydrogen Production Under Visible Light Irradiation," Journal of Allowys and Compounds 472 (2009) 429-433.
JP2003288955 (A), Oct. 10, 2013, Abstract Only, 2 Pages.
Kudo et al., "Heterogeneous photocatalyst materials for water splitting," Chem. Soc. Rev., 2009, vol. 38, pp. 253-278.
Murdoch et al., "The effect of gold loading and particle size on photocatalytic hydrogen production from ethanol over Au/TiO2 nanoparticles," Nature Chemistry, vol. 3, Jun. 2011; pp. 489-492.
Nadeem et al., "The photoreaction of TiO2 and Au/TiO2 single crystal and powder with organic adsorbates," Int. J. Nanotechnol., vol. 9, Nos. 1/2, 2012, pp. 121-162.
Rawle, "Basic Principles of Particle Size Analysis," Malvern Instruments Limited (1993), pp. 1-8.
Written Opinion of the International Searching Authority; International Applicaiton No. PCT/EP13/001190; Filing Date: Apr. 22, 2013; Date of Mailing: Jun. 25, 2013; 7 Pages.
Zhang et al., "Tailored TiO2—SrTiO3 Heterostructure Nanotube Arrays for Improved Photoelectrochemical Performance," ACS Nano, vol. 4, No. 1, (Jan. 26, 2010); pp. 387-395.
Zielinska et al., "Photocatalytic Hyrdrogen Generation over Alkaline-Earth Titanates in the Presence of Electron Donors," International Journal of Hydrogen Energy, vol. 33 (2008), pp. 1797-1802.

* cited by examiner

PHOTOCATALYST, METHOD FOR PREPARATION, PHOTOLYSIS SYSTEM

CROSS REFERENCE TO RELATED APPLICATIONS

This application is a 371 of International Application No. PCT/EP2013/001190, filed Apr. 22, 2013, which claims priority to European Application No. 12002966.5, filed Apr. 26, 2012, both of which are hereby incorporated by reference in its entirety.

The present invention relates a photocatalyst for the generation of diatomic hydrogen from a hydrogen containing precursor under the influence of actinic radiation, comprising a semiconductor support and one or more noble and/or transition metal(s) deposited on said semiconductor support.

The present invention further relates to a method for preparation of such catalysts, a photolysis system and to a method for generating diatomic hydrogen from hydrogen containing precursors.

Energy and environmental issues at a global level are important topics and to that extent focus has been on the generation of clean energy for some time. Hydrogen in its diatomic form as an energy carrier has the potential to meet at least in part the global energy needs. As a fuel, hydrogen boasts great versatility from direct use in internal combustion engines, gas turbines or fuel cells for both distributed heat and electricity generation needs. As a reacting component, hydrogen is used in several industrial chemical processes, such as for example the synthesis methanol, higher hydrocarbons and ammonia.

Unfortunately hydrogen is not naturally available in abundance in its diatomic form ($H_2$, also referred to as molecular hydrogen or diatomic hydrogen). Rather, due to its high reactivity, hydrogen is more commonly bonded to other elements, for example oxygen and/or carbon, in the form of water and hydrocarbons. The generation of diatomic hydrogen from these compounds is in contention with the laws of thermodynamics and therefore requires additional energy to break these naturally occurring bonds.

When diatomic hydrogen is reacted with oxygen the energy stored within the H—H bond is released while producing water ($H_2O$) as the end product. This, combined with the energy density of hydrogen of about 122 kJ/g gives clear advantages for the use of diatomic hydrogen as a fuel.

At present diatomic hydrogen is produced mainly from fossil fuels, biomass and water. Although the technique of diatomic hydrogen production by steam reforming of natural gas is mature it cannot guarantee long-term strategy for a hydrogen economy because it is neither sustainable nor clean. The diatomic hydrogen production through the electrolysis of water is not an energy efficient process as diatomic hydrogen obtained through this process carries less energy than the energy input that is needed to produce it.

Thus, research has focused on the development of new methods to produce hydrogen from renewable resources. Biomass is considered a renewable energy source because plants store solar energy through photosynthesis processes and can release this energy when subjected to an appropriate chemical process, i.e. biomass burning. In this way, biomass functions as a sort of natural energy reservoir on earth for storing solar energy.

The worldwide availability of solar energy is said to be about $4.3 \times 10^{20}$ J/h, corresponding to a radiant flux density of about 1000 W/m². About 5% of this solar energy is believed to be UV radiation with a light energy of above 3 eV. An advantageous method of storing this solar energy is through the generation of diatomic hydrogen. To that extent solar energy may be used in the photocatalysis of water or biomass products such as bio-ethanol into diatomic hydrogen.

Photocatalysis of water was first reported by Fujishima and Honda (Electrochemical Photolysis of Water at a Semiconductor Electrode, A. Fujishima and K. Honda, Nature, 1972, 238, 37). Since then numerous photocatalysts have been reported both in patent and scientific literature. A summary is provided by Kudo and Miseki (Heterogeneous photocatalyst materials for water splitting, A. Kudo, Y. Miseki, Chem. Soc. Rev., 2009, 38, 253-278). Others have reported that $TiO_2$ is the most photo catalytically active natural semiconductor known and that efficient use of sunlight can be obtained by modifying $TiO_2$ with noble metals, doping $TiO_2$ with other ions, coupling with other semiconductors, sensitising with dyes, and adding sacrificial reagents to the reaction solution (Nadeem et al., The photoreaction of $TiO_2$ and Au/TiO2 single crystal and powder with organic adsorbates, Int J. Nanotechnol., Vol. 9, Nos. 1/2, 2012; Photocatalytic hydrogen production from ethanol over Au/TiO2 anatase and rutile nanoparticles, Effect of Au particle size, M. Murdoch, G. W. N. Waterhouse, M. A. Nadeem, M. A. Keane, R. F. Howe, J. Llorca, H. Idriss*, Nature Chemistry, 3, 489-492 (2011); The Photoreaction of TiO2 and Au/TiO2 single crystal and powder Surfaces with organic adsorbates. Emphasis on hydrogen production from renewable. K. A. Connelly and H. Idriss*, Green Chemistry, 14 (2), 260-280 (2012)).

Yan et al (Nitrogen-doped $SrTiO_3/TiO_2$ composite photocatalysts for hydrogen production under visible light irradiation, Journal of Alloys and Compounds 472 (2009), 429-433) disclose Nitrogen-doped $SrTiO_3/TiO_2$ composite powders prepared by solid phase method and further combined with $TiO_2$ by means of a sol gel method.

JP 2003-288955 discloses a method and apparatus for producing hydrogen utilizing sunlight through the use of a multilayer thin-film solar cell catalyst panel formed by combining a solar cell having an enhanced electromotive force and a catalyst capable of lowering an overvoltage.

EP 0070712 discloses a catalysts for photo-assisted oxidation-reduction (redox) reactions. These catalysts consist of colloidal particles of a semiconductor, containing on their surface a reduction catalyst and an oxidation catalyst.

Zielinska et al (Photocatalytic hydrogen generation over alkaline-earthtitanates in the presence of electron donors, INTERNATIONAL JOURNAL OF HYDROGEN ENERGY 33 (2008) 1797-1802) discloses an investigation on the efficiency of alkaline-earth titanate-based compounds (Ca, Sr, Ba) for catalysts in photocatalytic hydrogen generation. The authors have shown that the addition of organic donors (such as formic acid, acetic acid, methanol, 2-propanol and formaldehyde) enhanced the efficiency of the studied process. The systematic study has shown that the most efficient organic donor in regards to its hydrogen generation efficiency is formic acid. Of the catalysts explored, the highest photocatalytic activity was shown by $SrTiO_3:TiO_2$.

US2003/144140 discloses a photocatalyst having a high catalytic function in the visible-light range and comprising an oxide composite having a junction formed by oxide semiconductors (I) and (II) which have photocatalytic properties with each other and whose energy levels of electrons at the bottom of the conduction band and energy levels of electrons at the top of the valence band in an energy band structure, based on the vacuum levels, differ from each other; at least one of the oxide semiconductors having photocatalytic properties even in the visible-light range.

EP 2092981 discloses a silica-based composite photocatalyst comprising a composite oxide phase principally including an oxide phase (first phase) composed mainly of a silica component, and a titania phase (second phase), the second phase having an existence ratio increasing with a gradient toward the surface layer, the second phase containing at least one metal oxide or more of strontium titanate and barium titanate.

An object of the present invention is to provide a photocatalyst for the generation of diatomic hydrogen from hydrogen containing precursors that provides a good yield in terms of hydrogen generation.

To that extent the present invention is directed to a photocatalyst for the generation of diatomic hydrogen from a hydrogen containing precursor under the influence of actinic radiation comprising semiconductor support particles comprised of $SrTiO_3$ and $TiO_2$ with one or more noble and/or transition metals deposited thereon and wherein a molar ratio of $SrTiO_3$ and $TiO_2$ in the semiconductor support particles is at least 0.01.

The present inventors have surprisingly found that semiconductor support particles comprised of these two materials may have a particulate shape with a high surface area that shows a high activity for hydrogen generation. The present inventors refer to such shape as nano-flakes. Such nano-flakes are less than 25 nm, preferably less than 20 nm, more preferably less than 10, most preferably less than 5 nm in their largest dimension. An agglomeration of such nano-flakes is referred to as nano-flowers. In addition, but without willing to be bound to it, the present inventors believe that the electronic state of the photocatalyst is enhanced due to the combination of these materials to the extent that it favors—when compared to $SrTiO_3$ or $TiO_2$ based photocatalysts—a higher rate of diatomic hydrogen generation per gram of catalyst. This enhancement is attributed to the large amount of intimate contact at atomic scale between the two materials.

$SrTiO_3$ has an indirect band gap of 3.25 eV and $TiO_2$ in its rutile form has a direct band gap of 3.0 eV. The present inventors believe that the interface of these two materials once prepared in intimate contact at the atomic scale retards the electron-hole recombination rate and thus enhances the photo-catalytic reaction.

For the avoidance of doubt it should be understood that the semiconductor support particles comprised of $SrTiO_3$ and $TiO_2$ according to the present invention are not to be confused with support particles formed by physically mixing/combining $SrTiO_3$ and $TiO_2$ particles. Rather the semiconductor support particles of the present invention contain $SrTiO_3$ and $TiO_2$ in the form of a physically inseparable mixture.

The molar ratio of $SrTiO_3$ and $TiO_2$ in the semiconductor support particles according to the present invention is preferably in the range of from 0.05 to 1, preferably from 0.1 to 0.5. The present inventors believe that within this range the electronic state of the semiconductor support is most enhanced and yields higher diatomic hydrogen generation rates.

In a preferred embodiment of the present invention the one or more noble and/or transition metals are deposited in the form of metal particles wherein an average major axis direction length of said metal particles, as determined by transmission electron microscopy, is at most 5 nm. The skilled person will understand that the deposited metal particles may not be perfectly spherical or circular in shape. Hence, a major axis length as used herein is to be understood as meaning the maximum axis length of the particle. The average major axis length is a numerical average. Metal particles in the photocatalyst of the present invention preferably have a major axis length of 15 nm at most more preferably of 10 nm at most.

Preferably the molar ratio of $SrTiO_3$ and $TiO_2$ in the semiconductor support particles of the present invention is selected such that the semiconductor support has one or more, preferably two bandgaps between 2.8 eV and 3.3 eV. The present inventors have found that the lower the band gap is, the higher the number of charge carriers and consequently also the higher the recombination rate of the charge carriers. The combination of $SrTiO_3$ and $TiO_2$, in particular in $TiO_2$ in rutile form, allows the combination of slow electron hole recombination rate and a relatively high number of charge carriers.

Preferably the one or more noble and/or transition metal(s) is/are selected such that it has a Plasmon loss in the range from 500 nm to 600 nm as determined by UV-Vis reflectance absorption. Although the mechanism is not fully understood the present inventors believe that a Plasmon loss in this range enhances the photoreaction.

The one or more noble and/or transition metal(s) may be selected from the group consisting of platinum, rhodium, gold, ruthenium, palladium and rhenium. For the avoidance of doubt it should be understood that the noble and/or transition metal particles in the photocatalyst of the present invention may also consist of a mixture of two or more of the above mentioned noble and/or transition metals.

In the photocatalyst of the present invention the noble and/or transition metals are preferably present for at least 75 wt %, preferably at least 95 wt % in their non-oxidised state. Non-oxidised meaning that it is in its pure metal state hence not bound to any oxidising material such as oxygen. It should be understood that this condition is preferred when the photocatalyst is used for the first time and/or after having been exposed to oxygen for some time between photolysis reactions. When the noble and/or transition metals are in an oxidised state their activity is lower. The present inventors nevertheless have found that, in the embodiment where the noble and/or transition metal is in an oxidised state, the activity of the photocatalyst will improve upon its use. A possible reason for this being that the hydrogen which is generated will reduce the oxidised particles. In order to increase the activity the photocatalysts according to the present invention may be exposed to reducing conditions prior to being used in photolysis.

The amount of noble and/or transition metal in the photocatalyst of the present invention is preferably in the range from 0.1 to 10 wt %, preferably from 0.4 to 8 wt % based on the combined weight of the semiconductor support particles comprised of $SrTiO_3$ and $TiO_2$ and the one or more noble and/or transition metals deposited thereon. For the avoidance of doubt it should be understood that this amount is based on the weight of the noble and/or transition metal per se, i.e. their elemental state, and not on any compound, such as an oxide thereof.

The photocatalyst of the present invention preferably has a BET surface area of at least 30 m² per gram of catalyst, more preferably from 30 to 60 m² per gram catalyst. The term "BET surface area" is a standardized measure to indicate the specific surface area of a material which is very well known in the art. Accordingly, the BET surface area as used herein is measured by the standard BET nitrogen test according to ASTM D-3663-03, ASTM International, October 2003.

The photocatalyst of the present invention is not doped with or otherwise contains nitrogen. Even though it is known that doping with nitrogen may shift the absorption of the catalyst to the visible light the present inventors have recognised that doping with nitrogen creates re-combinative centers which adversely affect the photocatalytic properties of the photocatalyst. Also, the marginal improvement in the reaction rate under visible light is largely negated by catalyst instability over time as well as a weaker activity under UV light.

The method for preparing the photocatalyst according to the present invention comprises the steps of i) combining a titanium precursor, preferably a titanium halogenide and a strontium salt solution, ii) raising the pH to a value such that precipitation occurs iii) washing the precipitate from step ii) with water iv) calcining the precipitate at a temperature in the range from 500 to 800° C. so as to form the support.

v) depositing the one or more noble or transition metals onto the support.

The titanium precursor may be any (water or alcohol) soluble titanium compound and is preferably selected from titanium tetra-alkoxides and titanium halogenides. In that respect a titanium halogenide is defined as a titanium compound wherein at least one halogen atom is bonded to the titanium atom. For example the titanium precursor may be $TiCl_4$, $TiR_4R_3TiCl$, $R_2TiCl_2$, $Cl_3TiR$ wherein R is —$OCH_3$, —$OC_2H_5$, —$OC_3H_7$, —$OC_4H_9$, or —$OC(O)CH_3$.

If the titanium precursor is a titanium halogenide then the pH in step i) will be low as a result of acid (e.g. HCl) formation. Depending on the amount of titanium halogenide and the amount of halogen atoms per titanium atom in the titanium halogenide however, the addition of additional acid, such as for example HCl, formic acid or acetic acid, to lower the pH to a value of at most 4 and preferably to a value of from 1 to 4 is preferred. If the titanium precursor is not a titanium halogenide the pH in step i) may be lowered to a value of from 1 to 4 by addition of an acid, such as for example HCl, formic acid or acetic acid.

Thus, in an embodiment step i) of the method of the present invention further comprises lowering the pH of the mixture obtained by combining said titanium precursor and strontium salt solution to a value of below 4, preferably from 1-4.

An important feature of the method of the present invention is that the support particles are precipitated from a solution comprising the strontium and titanium precursors, as this results in support particles comprised of strontium-titanate and titanium-dioxide wherein the strontium-titanate and titanium-dioxide are then obtained in the form of a physically inseparable mixture which allows an efficient atomic contact between these two materials. This efficient atomic contact in turn allows good photocatalytic performance. The method of the present invention therefore differs from the method disclosed in the article of Yan et al (Nitrogen-doped $SrTiO_3/TiO_2$ composite photocatalysts for hydrogen production under visible light irradiation, Journal of Alloys and Compounds 472 (2009), 429-433) wherein $SrTiO_3$ powder is combined with $TiO_2$ by a sol-gel method. The skilled person will understand that the manner in which $SrTiO_3$ and $TiO_2$ are present in the photocatalyst of the present invention differs very much from the manner in which these components are present in the photocatalyst obtained by the process of Yan et al.

The present invention thus relates to a photocatalyst for the generation of diatomic hydrogen from a hydrogen containing precursor under the influence of actinic radiation comprising semiconductor support particles comprised of $SrTiO_3$ and $TiO_2$ with one or more noble and/or transition metals deposited thereon and obtainable by the method of preparing such photocatalyst as herein disclosed.

Diatomic hydrogen may be generated from hydrogen containing precursors by contacting a photocatalyst according to the present invention with a hydrogen containing precursor while exposing the photocatalyst to actinic radiation.

The term hydrogen containing precursor as used herein is to be understood as meaning a compound containing chemically (i.e. covalently or ionically) bonded hydrogen atoms and which compound may successfully be used as a raw material for the photocatalytic generation of diatomic hydrogen. Hydrogen containing compounds that do not result in the photocatalytic generation of diatomic hydrogen are not to be considered as hydrogen containing precursors.

The hydrogen containing precursors as used in the photocatalytic process according to the present invention are preferably selected from the group consisting of water, alcohols and mixtures of water and alcohol(s). In other words, the hydrogen containing precursor may be a single chemical compound or a mixture of at least two chemical compounds. For the reason of readily availability it is preferred that the hydrogen containing precursor is a mixture of water and ethanol wherein the amount of ethanol is from 1% to 95% by weight, preferably from 30% to 95% by weight, more preferably from 60% to 95% by weight based on the weight of the hydrogen containing precursor. Ideally ethanol originating from biomass is used. The present invention however also allows photocatalytic generation of hydrogen from pure (i.e. 100%) ethanol or very high purity solutions thereof (i.e. solutions containing at least 99 wt % ethanol). Other alcohols, in particular the lower alcohols such as methanol, propanol and butanol may also be used. The present inventors believe that the generation of diatomic hydrogen is not limited to water and alcohols, but that other hydrogen containing materials such as for example sugars may also be successfully employed.

Actinic radiation as used herein is to be understood to mean radiation that is capable of bringing about the generation of diatomic hydrogen according to the aforementioned method. To that extent the actinic radiation will have at least a portion in the UV wavelength range being defined herein as from 10 nm to 400 nm. Preferably UV radiation in the range from 300 nm to 400 nm is used. Actinic radiation having a wavelength of less than 300 nm was found to be impractical in the context of the present invention. The photonic energy of the actinic radiation has to match at least the band gap energy. The radiant flux density, sometimes referred to as intensity, is preferably in the range from 0.3 $mW/cm^2$ to 3.0 $mW/cm^2$, more preferably about 1 $mW/cm^2$. Depending on season and geographical location this intensity is close to the UV intensity provided by sunlight, meaning that the photocatalytic formation of diatomic hydrogen can be carried out in a sustainable manner if sunlight is used.

The photocatalyst according to the present invention may be used in any photolysis system for the generation of diatomic hydrogen from a hydrogen containing precursor. Generally such systems comprise a reaction zone where the actual generation of diatomic hydrogen occurs and one or more separation zones for separating the diatomic hydrogen from other gasses that may be formed or are otherwise present. The systems that may be used includes photolysis systems where the photocatalyst is contacted with a hydrogen containing precursor in its liquid state but also systems where the photocatalyst is contacted with hydrogen containing precursors in its gaseous state, such as for example disclosed in U.S. Pat. No. 7,909,979. A combination system where diatomic hydrogen is formed from hydrogen containing precursors both in the liquid state as in the gaseous state is considered as a possible embodiment of the present invention, which would allow the use of a mixture hydrogen containing precursors having mutually different vapor tensions.

The semiconductor material used as support in the photocatalyst of the present invention may have the shape referred to as nano-flakes. An agglomeration of such nano-flakes is referred to as nano-flowers. These nano-flakes may have dimensions in the order of from 1 nm and 10 nm, preferably 3 nm to 7 nm in for the minor axis lengths (width and thickness) and from 15 nm to 50 nm preferably from 20 nm to 40 nm for the major axis length (length). The skilled person will understand that this nano-flake and/or nano-flower structure allows a high surface area.

Figure 2:
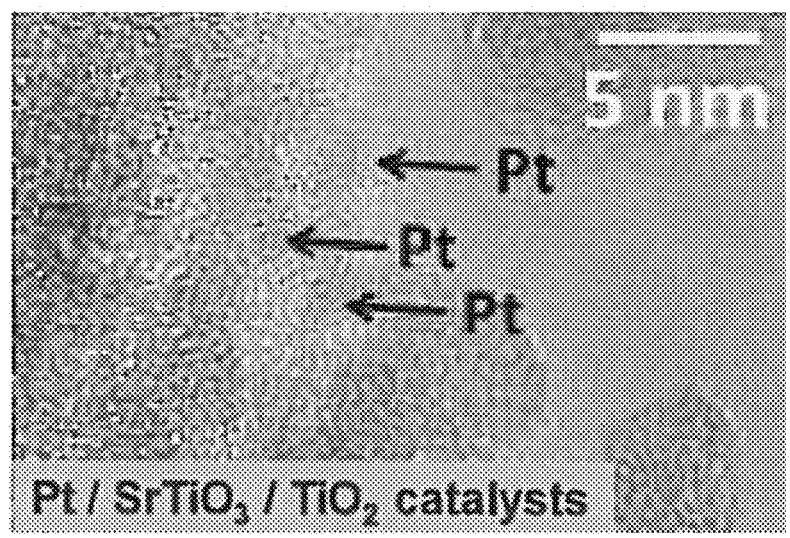
Figure 3:
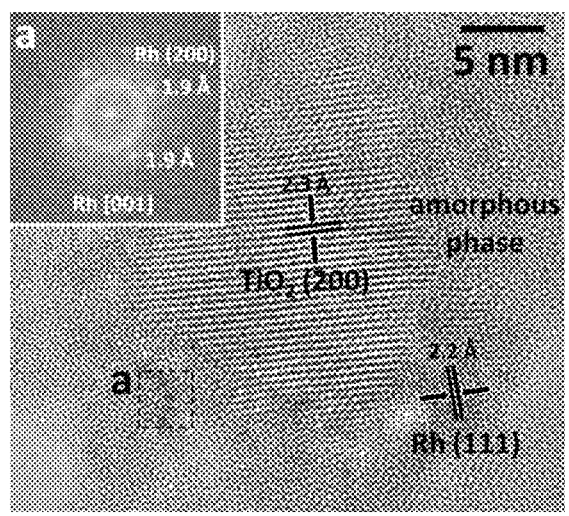

The present invention will now be explained by the following non-limiting examples and figures, wherein FIGS. 1a-1d show TEM pictures of photocatalysts according to the invention FIG. 2 shows a TEM picture of a photocatalyst according to the invention FIG. 3 shows a further TEM picture of a photocatalyst according to the invention Referring first to FIGS. 1a to 1d, these TEM pictures show that the photocatalysts of the invention may be described as nano-flowers or an agglomeration of nano-flakes. The composition of the nano-flakes was shown to contain $SrTiO_3$ and $TiO_2$ domains, which already from a size perspective, are physically inseparable. As a result of the small size of the domains there is large area of atomic contact between the two materials allowing for high photocatalytic activity. The metal, in this case rhodium, cannot be distinguished clearly from the support which is indicative for the very small particle size of the metal particles.

The small size of the metal particles is further clear from FIG. 2. The arrows indicate the position of the metal (as determined using TEM) yet no clear particles can be observed.

FIG. 3 is a further TEM picture of a photocatalyst according to the present invention. In this particular catalyst the inventors observed very small rhodium particles, see box "a" in FIG. 3. The rhodium was confirmed X-raw diffraction as can be seen in the upper left corner of FIG. 3. For this catalyst the present inventors further distinguished an amorphous phase of $TiO_2$ and rutile $TiO_2$.

Catalyst Preparation

Catalysts were prepared by the sol-gel method. $TiCl_4$ was added to a strontium-nitrate solution in appropriate amounts to make either strontium titanate ($SrTiO_3$) or strontium titanate with excess titanium oxide ($TiO_2$). Approximately thirty minutes after the addition of $TiCl_4$ to the strontium nitrate solution the pH was raised with sodium hydroxide to a value of between 8 and 9 at which pH value strontium hydroxide and titanium hydroxide precipitated.

The precipitate was left to stand for about 12 hours at room temperature to ensure completion of the reaction after which it was filtered and washed with de-ionized water until neutral pH (~7). The resulting material was then dried in an oven at 100° C. for a period of at least 12 hours. Next the material was calcined at a temperatures in the range from 500° C. to 800° C. X-ray diffraction techniques were used to indicate formation of $SrTiO_3$ alone or a mix of $SrTiO_3$ (perovskite) and $TiO_2$ (rutile and/or anatase).

The noble and/or transition metals were introduced from their precursors such as $RhCl_3$/HCl, $PtCl_4$/$H_2O$, $PdCl_2$/HCl, $RuCl_3$, etc. onto the semiconductor support. The solution was kept at about 60° C. under stirring until a paste formed.

Different preparations were conducted in which the HCl concentration was changed between 0.1 and 1 N. The paste was then dried in an oven at 100° C. for a period of at least 12 hours followed by calcination at a temperature in the range from 350° C. to 800° C.

Bimetals, i.e. a mixture of two noble and/or transition metals, were deposited in a co-impregnation methods whereby both metal precursors were added instead of only one. They were subjected to the same process of the monometallic photocatalysts preparation.

The BET surface area was determined using a surface area analyzer from Quantachrome Corporation.

The following catalysts were made:

TABLE 1

| | Molar ratio $SrTiO_3$/$TiO_2$ [—] | Metal Type | Concentration [wt %] | BET [$m_2$/g cat.] |
|---|---|---|---|---|
| I (comp.) | $TiO_2$ only | Pt | 1 | 3 |
| II (comp.) | $SrTiO_3$ only | Pt | 0.5 | 3.5 |
| III (comp.) | $SrTiO_3$ only | Rh | 0.5 | 13 |
| IV | 1:10 | Pt | 1 | 43 |
| V | 1:10 | Rh | 1 | 36 |
| VI | 1:10 | Pt | 1 | 11[a] |
| VII (comp) | $SrTiO_3$ only | Pt | 1 | 63 |

Comp = comparative example
[a] Calcined at 800° C.

Photolysis

Prior to the photolysis the catalysts were reduced with hydrogen at a temperature in the range from 300 to 400° C. for a period of one hour.

Next, 10 to 50 mg of catalyst were introduced into a Pyrex reactor with a total volume of between 100 and 250 ml. After purging with nitrogen, 10 to 20 ml of water and/or ethanol were introduced into the reactor. This was followed by further purging with nitrogen to degas the water and/or ethanol solutions.

The reaction was started by exposing the suspension to UV light of intensity between 0.5 and 2 $mW/cm^2$. The wavelength of the UV light was about 360 nm.

Extraction of the gas formed was conducted using a syringe. The extracted gas was analyzed using a gas chromatography device equipped with a thermal conductivity detector.

The following diatomic hydrogen gas generation rates were found for the photocatalysts listed in Table 1.

TABLE 2

| Catalyst | Water [wt %] | Ethanol [wt %] | H2 generation rate [mol/(gram cat. * min)] |
|---|---|---|---|
| I (comp) | 0 | 100 | $0.5 \times 10^{-6}$ |
| II (comp) | 50 | 50 | $0.25 \times 10^{-6}$ |
| III (comp) | 0 | 100 | $0.6 \times 10^{-6}$ |
| IV | 0 | 100 | $1.2 \times 10^{-6}$ |
| V | 100 | 0 | $0.15 \times 10^{-6}$ |
| V | 50 | 50 | $0.6 \times 10^{-6}$ |
| VI | 0 | 100 | $1.0 \times 10^{-6}$ |
| VII (comp) | 100 | 0 | $0.3 \times 10^{-6}$ |

Comp = comparative example

The invention claimed is:

1. A photocatalyst for the generation of diatomic hydrogen from a hydrogen containing precursor under the influence of actinic radiation comprising: semiconductor support particles comprising $SrTiO_3$ and $TiO_2$, and which semiconductor support particles have a noble and/or transition metal deposited thereon and wherein a molar ratio of $SrTiO_3$ and $TiO_2$ in the semiconductor support particles is at least 0.01, and wherein the photocatalyst is not doped with nitrogen.

2. The photocatalyst according to claim 1 wherein the ratio is in the range of from 0.05 to 1.

3. The photocatalyst according to claim 1, wherein the noble and/or transition metals is deposited in the form of metal particles wherein an average major axis direction length of said metal particles is at most 5 nm.

4. The photocatalyst according to claim 1, wherein the molar ratio is selected such that the semiconductor support has a bandgap between 2.8 eV and 3.3 eV.

5. The photocatalyst according to claim 1, wherein the noble and/or transition metal is selected such that it has a Plasmon loss in the range from 500 nm to 600 nm as determined by UV-Vis reflectance absorption.

6. The photocatalyst according to claim 1, wherein the noble and/or transition metal comprises at least one of platinum, rhodium, gold, ruthenium, palladium and rhenium.

7. The photocatalyst according to claim 1, wherein at least 75 wt % of the noble and/or transition metals is in its non-oxidised state.

8. The photocatalyst according to claim 1, wherein the noble and/or transition metal is present in an amount in the range from 0.1 to 10 wt % based on the combined weight of the semiconductor support particles and the noble and/or transition metals deposited thereon and based on the noble and/or transition metals in their elemental state.

9. The photocatalyst according to claim 1, wherein the catalyst has a BET surface area of from 30 to 60 m$^2$ per gram catalyst using the nitrogen absorption technique.

10. A method for preparing a photocatalyst according to claim 1, comprising:
   combining a titanium precursor and a strontium salt solution to form a mixture having a pH;
   raising the pH to a value such that precipitation occurs, forming a precipitate;
   washing the precipitate with water;
   calcining the precipitate at a temperature in the range of from 500 to 800° C. so as to form the support; and
   depositing the noble and/or transition metal onto the support.

11. The method of claim 10 wherein the combining step further comprises lowering the pH of the mixture to a value of at most 4.

12. A method for generating diatomic hydrogen from a hydrogen containing precursor, comprising contacting a photocatalyst according to claim 1 with the hydrogen containing precursor while exposing the photocatalyst to actinic radiation to forming the diatomic hydrogen.

13. Photolysis system for the generation of diatomic hydrogen comprising:
   a reaction zone containing a photocatalyst according to claim 1, with the method comprising
      combining a titanium precursor and a strontium salt solution to form a mixture having a pH;
      lowering the pH of the mixture to a value of at most 4;
      raising pH to a value such that precipitation occurs, forming a precipitate;
      washing the precipitate with water;
      calcining the precipitate at a temperature in the range of from 500 to 800° C. so as to form the support; and
      depositing the noble and/or transition metal onto the support.

14. A semiconductor material comprising $SrTiO_3$ and $TiO_2$ wherein a molar ratio of $SrTiO_3$ and $TiO_2$ is at least 0.01, said semiconductor material being obtainable by a method comprising:
   combining a titanium precursor and a strontium salt solution to form a mixture having a pH,
   raising the pH to a value such that precipitation occurs forming a precipitate;
   washing the precipitate with water; and
   calcining the precipitate at a temperature in the range of from 500 to 800° C. so as to form the semiconductor material; and
   wherein the semiconductor material is not doped with nitrogen.

15. The photocatalyst according to claim 4, wherein the molar ratio is selected such that the semiconductor support has two bandgaps between 2.8 eV and 3.3 eV.

16. The method of claim 10 wherein titanium precursor comprises a titanium halogenide.

17. The photocatalyst of claim 1, wherein the photocatalyst does not contain nitrogen.

18. The photocatalyst of claim 5, wherein the noble and/or transition metal comprises at least one of rhodium, gold, ruthenium, palladium, and rhenium.

19. The photocatalyst of claim 18, wherein the noble and/or transition metal comprises gold.

20. A photocatalyst for the generation of diatomic hydrogen from a hydrogen containing precursor under the influence of actinic radiation comprising: semiconductor support particles comprising $SrTiO_3$ and $TiO_2$, and which semiconductor support particles have a noble and/or transition metal deposited thereon and wherein a molar ratio of $SrTiO_3$ and $TiO_2$ in the semiconductor support particles is at least 0.01, wherein the $TiO_2$ comprises rutile $TiO_2$.

* * * * *